L. A. SHELDON.
PITOT PLUG FOR FLUID METERS.
APPLICATION FILED SEPT. 11, 1909.
1,087,988.
Patented Feb. 24, 1914.
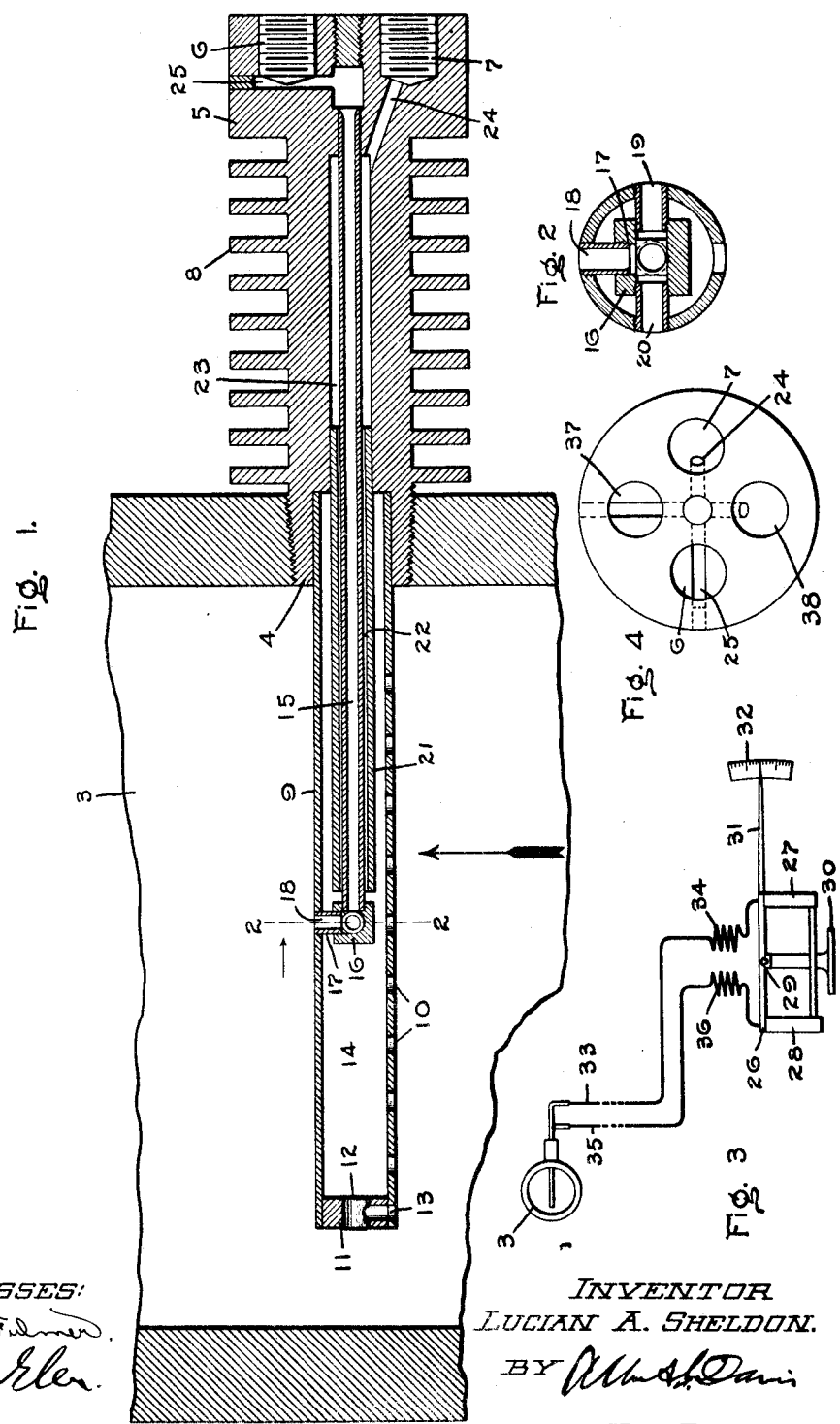
WITNESSES:
INVENTOR
LUCIAN A. SHELDON.
BY
HIS ATTORNEY.

UNITED STATES PATENT OFFICE.

LUCIAN A. SHELDON, OF SCHENECTADY, NEW YORK, ASSIGNOR TO GENERAL ELECTRIC COMPANY, A CORPORATION OF NEW YORK.

PITOT PLUG FOR FLUID-METERS.

1,087,988.  Specification of Letters Patent.  Patented Feb. 24, 1914.

Application filed September 11, 1909. Serial No. 517,299.

*To all whom it may concern:*

Be it known that I, LUCIAN A. SHELDON, a citizen of the United States, residing at Schenectady, in the county of Schenectady, State of New York, have invented certain new and useful Improvements in Pitot Plugs for Fluid-Meters, of which the following is a specification.

The present invention relates to the art of metering fluids wherein a plug device, or agent acting on the principle of a Pitot tube is employed to create a pressure difference which varies with variations in the rate of flow of the fluid being metered, the said pressure difference being utilized to actuate a metering mechanism directly or indirectly.

The object of my invention is to provide a Pitot plug of improved construction, and for a consideration of what I believe to be novel and my invention, attention is directed to the accompanying description and the claims appended thereto.

In the accompanying drawing illustrating one of the embodiments of my invention, Figure 1 is a horizontal axial section of a Pitot plug showing its position in a pipe or main through which the fluid to be metered flows; Fig. 2 is a cross-section of the plug taken on line 2—2 of Fig. 1; Fig. 3 is a view showing my improved plug connected to a meter; and Fig. 4 is an end view of the base.

The Pitot plug is intended more especially for use with meters that indicate, record or integrate the amount of steam or air that passes through a main in a given unit of time, but it is not necessarily limited thereto.

3 indicates the pipe or main through which the fluid to be metered flows in the direction of the large arrow, the pipe illustrated being arranged horizontally although it may extend vertically or be inclined. The main is provided with a relatively small screw-threaded opening in its wall to receive the end 4 of the base portion of the plug. By using this construction the plug can readily be mounted in existing mains at a small expense, it being unnecessary to take down any of the piping or disturb the connections. Further the amount of labor involved is small, and the apparatus supplied with fluid from the main need only be out of service for a very short time while the drilling and tapping is done. If the flow is to be measured only occasionally or one meter is to be used for several mains, the plug can be taken out, the meter removed and the opening in the wall of the main closed by a pipe plug. These features are of great advantage in power plants requiring the apparatus to be in service substantially all of the time.

The base is provided with a head 5 containing screw-threaded openings 6 and 7, Fig. 1, to receive the small pipes transmitting the fluid pressures from the plug to the meter proper. It is also provided with fins or projections 8, or equivalent means for radiating heat, the object being to condense any steam that may work into the passages contained therein.

One of the fundamental requirements of a device of this kind is that the pressure difference created thereby, which is due to the velocity of flow of the fluid being metered, shall represent the average velocity of the fluid as distinguished from that in any particular region or point of the cross-section of the main. To this end a tube or member 9 is provided which extends substantially across the main and forms a portion of the high-pressure or leading part of the plug. The length of the tube is, of course, determined largely by the diameter of the main. Since the velocity of the fluid is not uniform over the entire cross-sectional area, the tube should at least be long enough to cross the regions of minimum and maximum velocity of the fluid stream. I make this tube as small in diameter as is consistent with the function to be performed, so as not to offer undue opposition to the flow or create objectionable eddy currents.

The tube may be secured in the base by any suitable means. As shown it is fitted into a socket in the base and is retained by brazing or swaging. The tube is provided with a plurality of orifices 10 located in the same plane and facing the moving column of fluid. By using a plurality of orifices arranged as described, I obtain a much greater pressure difference for a given flow or velocity head than is possible with the old form of Pitot tube having a single opening that faces the moving column, the second opening being normal to said column, and this pressure difference is proportional to the average rate of flow. The end of the tube is provided with a closing device, such as the disk 11. This disk is provided with an axially extending orifice 12 and a second orifice 13 extending perpendicularly thereto, both of which occupy the same plane, the said plane coinciding with that of the orifices 10.

Since fluid meters of the character referred to depend for their operation upon relatively small pressure differences, it is important to eliminate the error which would be occasioned by substantially different lengths of water columns in the plug and the pipes leading to the meter. This is done in my improved construction, as will appear from the above and from the parts and arrangement thereof to be referred to later. Within the tube 9 is a chamber 14, in which the pressures of the different streams entering the orifices in said tube are equalized.

Located within the tube and concentric therewith is a small central tube 15 that extends through the base to its head and is there secured by brazing or swaging, usually the latter. This forms the low-pressure or trailing portion of the plug. The inner end of this tube is provided with a head 16 that is connected by the tube 17 with the region immediately surrounding the main or outer tube 9. The bore or orifice 18 in the tube 17 opens in the direction that the fluid is flowing. In other words, the high-pressure set of orifices 10 in the outer tube face forward and the low-pressure tube orifice 18 faces backward or rearward. The tube 17 extends through the outer tube 9 and is secured thereto and also to the head 16.

It is to be noted that the meter is below the level of the inner or central tube and hence water may accumulate in the low-pressure connection until it reaches the level of the bottom of the bore of the tube 15, after which the excess will drain or flow back into the main 3 from said central tube. In this sense the central tube forms a dam which holds an amount of water in the passage in the plug and the pipe leading to the low-pressure side of the meter whose level is substantially the same as that in the passage in the plug and the pipe leading to the high-pressure side of the meter, as will appear farther on. The head 16 is also connected at the top and bottom with the outer tube by short lengths of tubes 19 and 20. The bores of these tubes are of about the same diameter as that of the inner tube and occupy a plane perpendicular thereto. Being secured at their outer ends to the outer tube they serve to strengthen the structure as a whole. When the plug is in the position shown and the steam flows in the direction of the large arrow, the tube 20 drains the inner tube and prevents the water from rising therein above a certain level. When the flow is in the opposite direction, the plug is turned about its axis to face the flow and the tube 19 acts as a drain. The orifices of the tubes 19 and 20, in addition to serving as draining means for the central tube, also exert a greater or less suction effect thereon, and thus assist the trailing orifice in performing its function.

Located within the outer tube and between it and the inner tube is an intermediate tube 21 that is secured at one end in the bore of the base 4. Between the inner and intermediate tubes is a narrow space or passage 22 by means of which the fluid pressure is conveyed to the axial passage 23 in the base and by it to the passage 24 communicating with the pipe leading to the high-pressure side of the meter. In order to obtain the best effect I locate the outer end of the intermediate tube where the fluid enters it at approximately the center of the equalizing chamber 14 and of the main, but moderate departure from this will not seriously affect the action of the plug. The orifice 12 is in axial alinement with the tube 21 and is made of such a diameter that any water that may accumulate in the chamber 14 will drain away through said orifice before it rises above the bottom of the bore of the tube 21. The inner tube 15 conveys a somewhat lower fluid pressure than that in the outer tube to the passage 25 which is in communication by a suitable pipe with the low-pressure side of the meter.

By reason of the various tubes and orifices and their arrangement, the plug can be used in a horizontal pipe with the fluid flowing in the direction of the arrow, Fig. 1, or in the opposite direction, or in a vertical pipe with the flow up or down, and the respective levels of the tops of the water columns in the passages leading to the meter will be the same in all cases. It is to be noted, however, that the orifices 10 should always be made to face the moving column of fluid. This can be done by turning the base to the proper position. The tubes 15 and 21, which determine the levels of the tops of the water columns, being coaxial, the turning of the plug does not affect said levels.

The pressure due to the leading orifices 10 and the equalizing chamber 14 will be equal to the static pressure plus a certain amount due to the velocity head, while the pressure due to the trailing orifice or orifices will be somewhat less than the static pressure in the main, due to a slight suction effect caused by the fluid as it flows past the ends of the tube orifices 18, 19 and 20.

In Fig. 3 is shown one of my improved plugs connected to a meter. 3 indicates the main through which the fluid is supposed to be flowing in a direction away from the observer. The meter may be of any suitable type. For the purpose of illustration and not as a limitation, I have shown a meter comprising a tilting member 26 to which are attached connected mercury-containing cups 27 and 28. The member is supported on a knife-edge pivot 29 and the latter is carried by a standard 30. Attached to the tilting member and actuated thereby is an arm 31, pointer or other device, which as it moves over a calibrated scale 32 indicates the amount of fluid flowing in the main 3 at any given instant. High-pressure fluid is conveyed from the Pitot plug to the meter by the pipe 33 that is connected to the screw-threaded opening 7, Fig. 1. In this pipe is a flexible connection, which I have indicated diagrammatically at 34. This connection should freely convey fluid under pressure to the right-hand mercury cup without, however, offering any substantial opposition to the tilting movement of the member 26. Low-pressure fluid is conveyed to the low-pressure mercury cup 28 by the pipe 35, the latter containing a flexible connection 36 that is for the same purpose as the connection 34. As the velocity of the fluid in the main 3 changes the pressure difference, due to the Pitot plug, changes thereby causing the pointer 31 to assume different positions.

In Fig. 4 is shown an end view of the head portion of the base. It is provided with four openings 6, 7, 37 and 38. Two of these are used at a time, the remainder being closed by plugs. Openings 6 and 7 are used when the plug is in the position shown with horizontal flow of the fluid to be metered, and openings 37 and 38 when the flow of the fluid is vertical. When the main is inclined I may use one pair of openings or the other, depending upon said inclination.

In the operation of these Pitot plugs and the meter connected thereto I find that the pipes leading to the meter soon become filled with water, and also that water accumulates in the base up to the level of the lower side of the bores of the inner tubes 15 and 21. There is a slight difference in the level of the tops of the water columns equal to the radial distance from the inner surface of the tube 15 to the inner surface of the tube 21. This distance is, however, but a small fraction of an inch being even less in practice than the distance shown on the drawing where the dimensions of some of the parts have necessarily been exaggerated for the sake of making the drawing clearer. The pressure due to the weight of this almost minute column of water is insufficient to have any appreciable effect on the accuracy of the meter. In other words, since the plug occupies a horizontal position and means are provided for preventing the water level in one part from being substantially higher than in another part the effect of the water columns on the meter will be practically equal, and the error due to the accumulation of water is negligible.

By using radiating fins or projections on the base I have found that they afford sufficient cooling surface to cause the necessary condensation, even though the steam being metered is highly superheated.

It will be seen that the structure is simple to manufacture, and is mechanically strong, so that it will not warp or distort when made in large sizes.

I use the same construction for all sizes of mains, but, of course, change the lengths of the tubes to suit the pipe diameters. I may and usually do use a smaller base for small mains than for large.

It is to be noted that my improved plug has the two essential features for successful operation, i. e., it produces a pressure difference depending upon the average velocity in the main, and maintains a practically constant head of water on the meter, so that the correct pressure difference will be indicated.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is—

1. A Pitot plug for meters for determining the rate of flow of fluid through a main, comprising a Pitot tube device located in the main that receives the impact of the flowing fluid and thereby creates a pressure difference having a definite relation to the rate of flow, said device being provided with passages in communication with the main and the meter in which condensation from the fluid can collect, and means independent of said passages and within the main for draining liquid of condensation from the device into said main to prevent the liquid from exceeding a predetermined level in the passages.

2. A Pitot plug for meters for determining the rate of flow of fluid through a main, comprising a Pitot tube device in which the impact of the flowing fluid produces a pressure having a definite relation to the average velocity of flow in the main, and a second device subjected to the action of the fluid in which there is a pressure lower than the first pressure, both of said devices having passages in communication with the main and the meter in which condensation from the fluid can collect, and means independent of the passages and within the main for draining off liquid of condensation into said main to maintain a predetermined level of liquid in said passages.

3. A Pitot plug for meters for determining the rate of flow of fluid through a main comprising means having high and low-pressure orifices exposed to the flowing fluid, an equalizing chamber for the high-pressure orifices, passages leading from the low-pressure orifices and the chamber to the meter, and means coöperating with said orifices to drain liquid of condensation from the passages into the main to maintain a predetermined level of liquid in said passages.

4. In combination, a main through which the fluid to be metered flows, and a means which extends transversely of the main and is provided with a plurality of high-pressure orifices that are subjected to the average velocity of the fluid flowing in the main, said fluid entering the orifices and condensing to a greater or less extent within the means, and a device for regulating the quantity of liquid of condensation contained therein.

5. In combination, a main, and a Pitot plug comprising a base carried by the main, with tubular means supported by the base and projecting into the main which is provided with a plurality of forwardly opening orifices that are located so as to be exposed to the flow velocities at different points of the cross-section of the main, and other tubular means supported by the base and provided with orifices that are arranged in a different relation to the direction of flow.

6. The combination of a main, and a Pitot plug inserted in the main comprising concentrically arranged tubes, the outer tube having forwardly opening orifices which are exposed to the action of the fluid to be metered at different points of the cross-section of the main and the inner tube having other orifices arranged in a different relation to the direction of flow, with means for transmitting the pressure difference due to said orifices to a meter.

7. A Pitot plug for fluid meters comprising a base, concentric tubes mounted therein, said tubes having forwardly and rearwardly opening orifices which are exposed to the fluid being metered and an equalizing chamber for certain of said orifices, and means for conveying fluid pressures from said tubes to the meter.

8. A Pitot plug for a fluid meter comprising a base, outer, inner and intermediate tubes, the outer and inner tubes having orifices that are acted upon by the fluid to be metered, said intermediate tube being separated from the inner by a space forming a fluid passage, and means for conveying fluid from the inner tube and said passage to the meter.

9. In a Pitot plug for a fluid meter, the combination of a base, an outer tube carried thereby and provided with a set of orifices located in the same plane, an inner tube, a means for conveying fluid under pressure through the wall of the outer tube to the inner tube, and means for conveying fluid pressures from said tubes to the meter.

10. In a Pitot plug for a fluid meter, the combination of a base, an outer tube carried thereby and provided with a set of orifices, an inner tube, a head therefor, means extending through the outer tube into said head for conveying fluid under pressure to the inner tube, and means for conveying fluid under pressure from the tubes to the meter.

11. In a Pitot plug for a fluid meter, the combination of a base, a member carried thereby which occupies a horizontal position in the main through which the fluid to be metered is flowing, said member having orifices that face the flowing fluid, there being an equalizing chamber in said member communicating with the orifices, a second hollow member within the first, and means communicating fluid under pressure to the second member and also acting as a drain, said pressure being less than that in the chamber, there being passages in the base for transmitting the pressure difference into and through the same.

12. In a Pitot plug for a fluid meter, the combination of a base, a tube carried thereby which has a plurality of orifices facing the moving fluid to be metered, an inner concentric tube, means comprising a part arranged in the direction of flow and another part at right angles thereto, which parts extend through the outer tube and convey fluid under pressure to the inner tube, and an intermediate tube which surrounds the inner tube, is separated therefrom by a small space, and is supported by the base, there being passages in the base for conveying fluid pressure from the inner and outer tubes through said base.

13. In a Pitot plug for fluid meters, the combination of a device on which the flowing fluid acts to create a pressure difference depending upon the velocity of flow, said device having passages in open communication with the fluid in which said fluid condenses to a greater or less extent, and means for maintaining a predetermined level of the liquid of condensation in said passages, with means carried by the plug and located outside of the path of said fluid for condensing fluid in said pressure creating device.

14. In a Pitot plug for fluid meters, the combination of concentrically arranged tubular members provided with devices which coöperate to produce a pressure difference depending upon the velocity of the fluid being metered, a support therefor, and means carried by the support for radiating heat therefrom to condense the fluid therein.

15. In a Pitot plug for fluid meters, the combination of concentrically arranged tubular members having high and low pressure orifices which serve to create a pressure difference that varies with changes in the velocity of the flowing fluid, some of the fluid entering said orifices and condensing to a greater or less extent within said plug, and one of said members having an orifice coöperating with one of the low pressure orifices to maintain substantially the same liquid level in both members, a support for the members, and heat radiating fins on said support.

16. In a Pitot tube for fluid meters, the combination of a base with concentric tubes supported thereby at one end and which extend transversely of the column of fluid to be metered, said tubes having orifices, and the orifices of one tube facing said column.

17. In combination, a meter that is sensitive to pressure differences, a main through which the fluid to be metered flows, a Pitot plug located in the main which creates a pressure difference depending upon the average velocity of the fluid flowing in the main, some of the fluid entering the plug and condensing to a greater or less extent therein, and connections for transmitting the pressure difference to the meter, there being drainage means in said plug for maintaining a predetermined level of liquid of condensation in said meter connections.

18. In a Pitot tube for fluid meters, the combination of a base having two passages therein, with concentric tubes supported at one end by the base and extending transversely of the column of fluid to be metered, the inner tube terminating approximately at the middle of the column and connecting at the other end with one of the passages in the base, a wall that extends across the unsupported end of the outer tube and is provided with an axially arranged opening therethrough, there being a series of orifices in the walls of the outer tube that face the flowing column of fluid and a passage connecting one of said orifices with the opening in said wall, and tubular means connecting the end of the inner tube with the region surrounding the outer tube, there being a tube intermediate the inner and outer tubes that extends from a point approximately at the middle of the interior of the outer tube to the other passage in the base.

19. In combination, a main through which a fluid flows, and a Pitot tube device comprising a supporting means carried by the main with a plurality of tubular members mounted in said means, one of the members being provided with a plurality of orifices that open toward the flow and are located so as to be exposed to the flow velocities at different points of the cross-section of the main, and another of said members being arranged adjacent the first and provided with orifices communicating with the interior of the main.

20. The combination of a main through which a fluid flows, and a Pitot tube device comprising two tubular members that extend into the main, one of said members being provided with orifices that are directed toward the flow and arranged at different points of the cross-section of the main, and the other member being arranged adjacent the first and provided with orifices communicating with the interior of the main that are arranged in a different relation to the direction of flow.

21. The combination of a main through which a fluid flows, and a Pitot tube device comprising two tubular members that extend into the main, one of said members being provided with a plurality of lateral orifices that are arranged at different points of the cross-section of the main to receive the impact of the flowing fluid, the other member being arranged parallel to the first and provided with at least one lateral orifice opening into the interior of the main.

22. In a Pitot plug for a fluid meter, the combination of a device having a plurality of orifices suitably spaced apart so as to be acted upon by the average velocity of the fluid being metered, conduit means common to and receiving fluid from all of said orifices, another orifice in said device which faces in a different direction from the first named orifices and is subjected in a limited region to the action of the fluid being metered, and a base for the device which has a passage communicating with the conduit means and an independent passage communicating with the last named orifice.

In witness whereof, I have hereunto set my hand this 9th day of September, 1909.

LUCIAN A. SHELDON.

Witnesses:
BENJAMIN B. HULL,
FRED KLAUMINZER.